United States Patent [19]

Hung et al.

[11] Patent Number: 5,164,077
[45] Date of Patent: Nov. 17, 1992

[54] PROCESS FOR REMOVAL OF CALCIUM FROM A HYDROCARBON FEEDSTOCK

[75] Inventors: Chi-Wen Hung, San Rafael; Bruce E. Reynolds, Martinez, both of Calif.

[73] Assignee: Chevron Research and Technology Company, San Francisco, Calif.

[21] Appl. No.: 776,151

[22] Filed: Oct. 15, 1991

Related U.S. Application Data

[63] Continuation-in-part of Ser. No. 561,021, Aug. 1, 1990, abandoned, which is a continuation-in-part of Ser. No. 458,128, Dec. 28, 1989, abandoned, and a continuation-in-part of Ser. No. 457,996, Dec. 28, 1989, abandoned.

[51] Int. Cl.$^5$ .................. C10G 45/00; C10G 45/60
[52] U.S. Cl. .................. 208/251 H; 208/251 R; 208/254 H; 208/216 R
[58] Field of Search .................. 208/251 H

[56] References Cited

U.S. PATENT DOCUMENTS

| | | | |
|---|---|---|---|
| 3,948,759 | 4/1976 | King et al. | 208/106 |
| 4,003,823 | 1/1977 | Baird, Jr. et al. | 208/108 |
| 4,003,824 | 1/1977 | Baird, Jr. et al. | 208/108 |
| 4,051,015 | 9/1977 | Bearden, Jr. et al. | 208/108 |
| 4,120,780 | 10/1978 | Morimoto et al. | 208/211 |
| 4,354,927 | 10/1982 | Shih et al. | 208/251 H |
| 4,430,206 | 2/1984 | Rankel | 208/251 R |
| 4,447,317 | 5/1984 | Miller et al. | 208/216 R |
| 4,539,101 | 9/1985 | Oleck et al. | 208/251 H |
| 4,582,595 | 4/1986 | Audeh et al. | 208/216 R |
| 4,606,812 | 8/1986 | Swanson | 208/108 |
| 4,613,425 | 9/1986 | Higashi et al. | 208/89 |
| 4,619,759 | 10/1986 | Myers et al. | 208/210 |
| 4,657,663 | 4/1987 | Gardner et al. | 208/210 |
| 4,657,664 | 4/1987 | Evans et al. | 208/211 |
| 4,671,866 | 6/1987 | Coombs et al. | 208/251 H |
| 4,741,821 | 5/1988 | Hung et al. | 208/251 H |
| 4,744,888 | 5/1988 | Hung et al. | 208/251 H |
| 4,761,220 | 8/1988 | Beret et al. | 208/59 |
| 4,789,462 | 12/1988 | Byrne et al. | 208/213 |
| 4,830,736 | 5/1989 | Hung et al. | 208/251 H |
| 4,853,109 | 8/1989 | Reynolds | 208/252 |

*Primary Examiner*—Helane Myers

[57] ABSTRACT

A process for removing calcium from a hydrocarbon feed having at least 1 ppm oil-soluble calcium. The process employs a catalyst system, comprising catalyst particles, wherein a high volume percent of the catalyst particles are in the form of mesopores (less than 1000 Angstrom in diameter), low surface area, low hydrogenation activity, and th inclusion of Group VIII metals, in particular nickel, on a silica catalyst base.

7 Claims, 1 Drawing Sheet

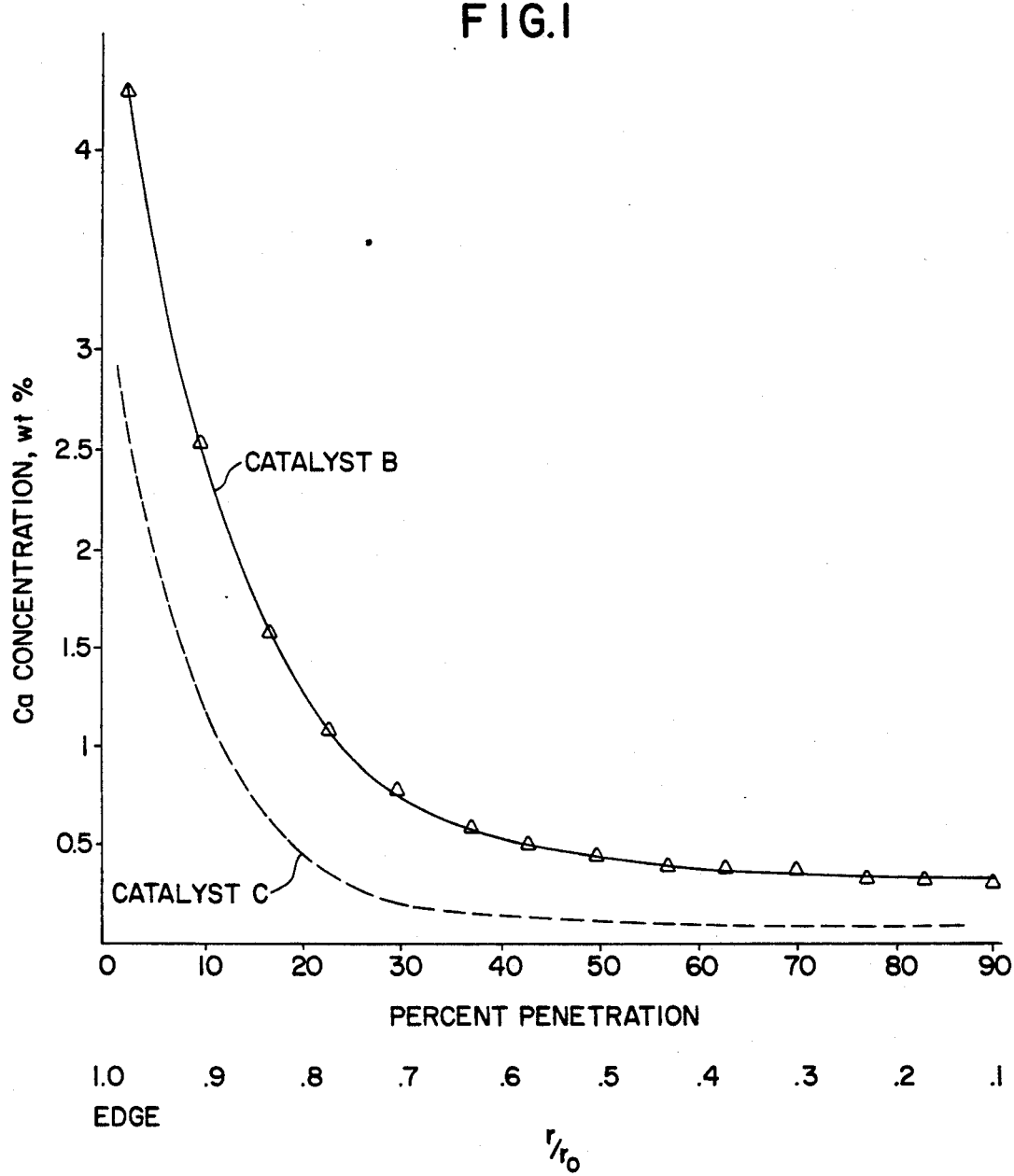

PROCESS FOR REMOVAL OF CALCIUM FROM A HYDROCARBON FEEDSTOCK

CROSS REFERENCE TO RELATED CASES

This is a continuation-in-part of application Ser. No. 561,021 filed Aug. 1, 1990, now abandoned which, in turn, is a continuation-in-part of application Ser. No. 458,128 filed Dec. 28, 1989, now abandoned, and application Ser. No. 457,996 filed Dec. 28, 1989, now abandoned.

FIELD OF THE INVENTION

The present invention relates to a process for removing calcium from a hydrocarbon feedstock.

A few, but increasingly important, petroleum crude feedstocks, residua, and deasphalted oil derived from them, contain levels of calcium and sodium which render them difficult, if not impossible, to process using conventional refining techniques. Certain crudes contain high concentrations of organically-bound calcium. These species have been attributed to either naturally occurring metal complexes or solubilized metal compounds from recovery waters which comes in contact with crude oils. These compounds are not separated from the feedstock by normal processes, such as desalting. Hydrotreating the residua from these crudes deposits the calcium onto the hydrotreating catalyst, leading to accelerated catalyst activity loss and high reactor pressure drop. Examples of feedstocks demonstrating objectionably high levels of calcium compounds are crudes from China, such as Shengli No. 2, and those from the San Joaquin Valley in California, generally contained in a pipeline mixture referred to as San Joaquin Valley crude or residuum.

We have filed a number of patent applications for catalysts which are useful for removing calcium from residua, all commonly assigned to the assignee of the present invention. U.S. Pat. No. 4,741,821 teaches using a catalyst having at least 10 volume percent pores greater than 1000 Angstrom in diameter (macropores) and containing less than 3.5 wt. % Group VIII metal and less than 8.0 wt. % Group VIB metal. U.S. Ser. No. 560,627 claims a catalyst system having at least 5 volume percent macropores or having an average mesopore diameter of 100-800 Angstrom and having between 0.2 and 10.0 wt. % of a Group I metal. U.S. Ser. No. 561,021 claims a process for removing calcium using that catalyst system.

Workers in the field encounter a more complex problem when metals such as calcium or iron are present as in an oil-soluble form. In contrast to nickel and vanadium which deposit near the external surface of the catalyst particles, these metals can deposit preferentially in the interstices, i.e., void volume, among the catalyst particles, particularly at the top of the hydrogenation catalyst bed. This results in drastic increases in pressure drop through the bed and effectively plugs the reactor.

Conventional processes, which remove nickel, vanadium, and iron, generally have decreasing macroporosity and increasing mesoporosity in the direction of feed flow through the graded bed. The term "macropore" is used in the art and is used herein to mean catalyst pores or channels or openings in the catalyst particles greater than about 1000 Angstrom in diameter. Such pores are generally irregular in shape and pore diameters are used to give only an approximation of the size of the pore openings. The term "mesopore" is used in the art and used herein to mean pores having an opening of less than 1000 Angstrom in diameter. Mesopores are, however, within the range of less than 1000 Angstrom in diameter.

Previous workers found macroporosity in a first catalyst zone of a multizone catalyst system to be strongly related to the capacity of catalyst particles to retain heavy metals removed from contaminated hydrocarbon feed. In the following catalyst zones, they prefer predominantly mesoporous catalysts. They found these catalysts to have substantially higher catalytic activity for hydrogenation compared to catalysts having lower surface areas and substantially a macroporous structure. Thus, they exploited these two phenomena to remove heavy metals from heavy feedstocks in a graded catalyst system.

In general, we have found that calcium deposits preferentially in the void volume among the catalyst particles. This greatly increases pressure drop through the bed and results in enormous reactor inefficiencies. In order to devise an effective catalyst system for the removal of calcium, factors such as shape, size, porosity, and surface activity of the catalyst particles must be considered.

It is an object of our invention to provide an improved catalytic process for removing calcium from a hydrocarbon feedstock.

SUMMARY OF THE INVENTION

This invention concerns a process for removing calcium from a hydrocarbon feed having at least 1 ppm oil-soluble calcium. A catalyst system comprising catalyst particles is employed, wherein the catalyst particles are comprised of a Group VIII metal on a silica base. Surprisingly, when silica is used as a base for a calcium removal catalyst, the calcium removed from the residua migrates well into the catalyst pores before depositing on the catalyst walls. This results in a high calcium capacity for silica based catalysts. The alumina bases taught in U.S. Pat. No. 4,741,821 cause the calcium to deposit nearer the outer surface of the calcium removal catalyst particles, leading to generally lower calcium capacity.

The catalyst of this invention is generally comprised of a Group VIII metal supported on a silica base. The silica base has a pore structure with an average pore size greater than 150 Angstrom, and preferably greater than 200 Angstrom, with an insignificant (less than 5%) number of macropores (pores greater than 1000 Angstrom in diameter). The Group VIII metal content is less than 10 wt. %, preferably less than 5 wt. %.

A preferred Group VIII metal is nickel. The nickel content is preferably less than about 5 wt. % nickel. Nickel is deposited onto the catalyst using methods known to the art, including impregnation from a solution of a soluble nickel salt. Methods for making the catalyst, and process conditions useful for removing calcium from hydrocarbon feedstocks using the catalyst, are recited in U.S. Pat. No. 4,741,821.

BRIEF DESCRIPTION OF THE DRAWING

FIG. 1 is a graphic representation of calcium concentration versus penetration into the surface of the catalyst of the present invention and comparative alumina based catalyst.

DETAILED DESCRIPTION OF PREFERRED EMBODIMENTS OF THE INVENTION

According to the present invention, a calcium-containing hydrocarbon feedstock is contacted under hydrodemetalating conditions with a catalyst system. The system comprises catalyst particles characterized as having a high volume percent of their pore volume in the form of mesopores, a low surface area, low hydrogenation activity, containing Group VIII metals, preferably nickel, at a concentration of less than 10% by weight, and supported on a silica base.

Feedstock

The feedstocks of this invention can be any hydrocarbonaceous feedstocks that contain dissolved calcium. Significant amounts of nickel, vanadium, and iron may also be present. Ordinarily, preferred feedstocks are those having more than 1 ppm of calcium and more preferably having more than 3 ppm, most preferably having more than 20 ppm. They will typically also contain more than 20 ppm of other metals such as nickel, vanadium, and iron. In addition, they generally contain more than 1.0 wt. % sulfur and frequently more than 2.0 wt. %. The feedstocks suitable for this invention can be crudes, topped crudes, atmospheric or vacuum residua, vacuum gas oil, and liquids from coal, tar sands, or oil shale. For example, we tested two vacuum residua from a double desalted Shengli No. 2 crude oil obtained from The People's Republic of China which contain about 57 ppm of calcium, and about 65 ppm of other heavy metals.

Catalysts

For particular levels of calcium present in the feedstock, we must carefully select parameters such as porosity and hydrogenation activity of the catalyst particles to obtain the desired calcium removal and catalyst utilization.

We determine the pore size distribution within the catalyst particle by mercury porosimetry which is based on a mercury intrusion technique. The mercury intrusion technique is based on the principle that the smaller a given pore the greater will be the mercury pressure required to force mercury into that pore. Thus, if we expose an evacuated sample to mercury and apply pressure incrementally with the reading of the mercury volume disappearance at each increment, we can determine the pore size distribution. The relationship between the pressure and the smallest pore through which mercury will pass at the pressure is given by the equation:

$$r = -2\sigma \cos \theta / P$$

where,
$r$ = the pore radius
$\sigma$ = surface tension
$\theta$ = contact angle
$P$ = pressure.

Using pressures up to 60,000 psig and a contact angle of 140 degrees, the range of pore diameters encompassed is 35–10,000 Angstrom.

The average mesopore diameter is calculated as:

$$\frac{40,000 \times \text{Mesopore Volume, cc/g}}{\text{Surface area, m}^2/\text{g}}$$

where mesopore volume = total pore volume − macropore volume, and macropores are defined as pores greater than 1000 Angstrom.

We characterize the catalysts for this invention as having an average size greater than 150 Angstrom, and preferably greater than 200 Angstrom, with an insignificant (less than 5% of the pore volume) number of macropores (pores greater than 1000 Angstrom in diameter); and a surface area less than about 250 m$^2$/g, and preferably less than about 180 m$^2$/g.

Metals are loaded onto these catalyst supports using methods known to the art, such as by impregnation. In particular, it is preferred to include Group VIII metals on the catalyst. Preferred Group VIII metals includes nickel and cobalt. The preferred metal is nickel. The catalysts of this invention have less than 10.0 wt. %, preferably less than 5.0 wt. %, and most preferably less than 4.0 wt. % Group VIII metals impregnated onto the support.

Preparation of Catalysts

Silica supports suitable for this invention can be prepared by conventional processes. The form of the silica support depends on the particular reaction configuration, and can be in the form of, for example, powders, spheres, extrudates, pellets, tablets, and the like.

The Group VIII catalytic agents used for typical catalysts may be incorporated into the silica support by any suitable method, particularly by impregnation procedures ordinarily employed in the catalyst preparation art. The preferred catalytic agents for the present invention are Group VIII metals. Preferred Group VIII metals include nickel and cobalt. The preferred metal is nickel. The amount of Group VIII metal should be less than 10 wt. % of the composition. They can be incorporated into the catalyst as metal salts, such as nitrates, chlorides, and carbonates. In general, the salts will decompose to the respective oxides upon calcining or under reactor conditions.

Details of incorporating catalytic agents into the silica support are fully described in U.S. Pat. No. 4,341,625, issued Jul. 27, 1982; U.S. Pat. No. 4,113,661, issued Sep. 12, 1978; and U.S. Pat. No. 4,066,574, issued Jan. 3, 1978; all to Tamm. These patents are incorporated herein by reference.

Hydrodemetalating Conditions

The process of this invention can take place in any convenient mode, for example, in fluidized bed, moving bed, or fixed bed reactors depending on the types of process desired. The formulations of the catalyst particles will vary depending on the conversion process and method of operation. In general, hydrodemetalation conditions include temperatures in the range of about 500° F. to about 900° F., preferably about 600° F. to about 800° F., most preferably about 650° F. to about 800° F.; total pressures in the range of about 500 psig to about 3500 psig, preferably from about 1200 psig to about 3000 psig, most preferably from about 1600 psig to about 2800 psig; hydrogen partial pressures in the range of about 600 psig to about 2800 psig, preferably about 1000 psig to about 2500 psig, most preferably about 1500 psig to about 2200 psig; and space velocities ranging from about 0.1 to about 6.0, preferably from about 0.5 to about 6.0, most preferably about 0.5 to about 1.7.

We exemplify the present invention below. The example is intended to illustrate a representative embodiment of the invention and results which have been obtained in laboratory analysis. Those familiar with the art will appreciate that other embodiments of the invention will provide equivalent results without departing from the essential features of the invention.

EXAMPLES

Example 1

Preparation of Nickel-Containing Catalyst (Catalyst A)

Catalyst A was prepared using 1/16-inch diameter silica spheres having a surface area of 53 m²/g, a total pore volume of 0.981 cm³/g, and an average pore diameter of 600 Angstrom. The silica spheres were impregnated with 3.76 wt. % nickel from a nickel nitrate solution. The impregnated catalyst was dried at 250° F. and calcined at 950° F.

Example 2

Preparation of Nickel-Containing Catalyst (Catalyst B)

Catalyst B was prepared using essentially the same materials in essentially the same way as Catalyst A, the only difference being that Catalyst B contained 2.9 wt. % nickel on the calcined catalyst.

Example 3

A fixed catalyst bed containing 10 cc of Catalyst B was contacted in the presence of hydrogen, with a vacuum resid cut from a double desalted Shengli No. 2 crude oil obtained from The People's Republic of China. The oil's properties, as determined using conventional techniques, are summarized in Table 1. We operated the bed at 1.68 LHSV, 2500 psig total pressure, 1950 psia hydrogen partial pressure, 5000 SCF/bbl, and 760° F.

TABLE 1

| Vacuum Resid Cut Used in Test | |
|---|---|
| | Feed 1 |
| LV % 538° C.+ (1000° F.+) | 81 |
| Sulfur, wt. % | 2.8 |
| Nitrogen, wt. % | 0.85 |
| MCRT, wt. % | 16.0 |
| Hot C$_7$ Asphaltene, wt. % | 5.7 |
| Viscosity, CS 100° C. | 1107 |
| Metals, ppm | |
| Ni | 31 |
| V | 4 |
| Fe | 22 |
| Ca | 58 |
| Na | 11 |

Example 4

Preparation of Nickel-Containing Catalyst on Alumina Base (Catalyst C)

Comparative Catalyst C was prepared according to the method taught in U.S. Pat. No. 4,741,821, which is incorporated herein by reference. This catalyst was composed of 2 wt. % nickel on an alumina base, this catalyst having 40% of its pore volume in the form of macropores greater than 1000 Angstrom in diameter.

Calcium Removal from Feed

Feed 1 was passed through a fixed catalyst bed comprising Catalyst B at the following conditions: 1.68 LHSV, 2500 psig total pressure, 1950 psia hydrogen partial pressure, 5000 SCF/bbl, and 760° F. For comparison, Feed 1 was then passed through a fixed Catalyst bed comprising Catalyst C, the volume of Catalyst C being equal to that which was used for Catalyst B. After the run, the spent catalysts were measured by microprobe analysis. FIG. 1 shows the interval scans for Catalyst B and Catalyst C. Catalyst B shows a more uniform calcium distribution, and a higher level of calcium deposition than Catalyst C. FIG. 1 thus demonstrates the superior calcium accumulating effect of the present catalyst over the prior art, with improved penetration into the interior of the catalyst body.

FIG. 1 may also be compared to FIG. 1 of U.S. Pat. No. 4,830,736. The superior calcium accumulating effect of the present catalyst over that taught in '736 can particularly be seen at twenty percent penetration. At twenty percent penetration, the calcium concentration is about 1.25 wt. % for the present catalyst as compared to about 0.1 wt. % for the '736 catalyst. Also, at $r/r_0$ less than 0.8, the calcium concentration approaches zero for the catalyst taught in '736, while for the present catalyst, the calcium concentration varies between 0.4 and 1.25 wt. %.

What is claimed is:

1. A process for hydrodemetalating a hydrocarbon feedstock, using catalyst particles, in a catalyst system wherein the process comprises: passing said feedstock, having at least 1 ppm oil-soluble calcium, in the presence of hydrogen, in contact with said catalyst particles under hydrodemetalating conditions, wherein said catalyst particles consist of:
    (a) a support consisting essentially of silica;
    (b) an average pore size greater than 150 Angstrom;
    (c) a surface area of less than about 250 m²/g; and
    (d) more than 2 wt. % and less than 10 wt. % of a Group VIII metal, wherein the Group VIII metal is selected from the group consisting of nickel and cobalt, for removal of oil-soluble calcium from said feedstock.

2. A process, according to claim 1, wherein said catalyst particles consist essentially of:
    (a) an average pore size greater than 200 Angstrom;
    (b) a surface area no more than 180 m²/g; and
    (c) more than 2 wt. % and less than 4 wt. % of a Group VIII metal, wherein the Group VIII metal is selected from the group consisting of nickel and cobalt, for removal of oil-soluble calcium from said feedstock.

3. A process according to claim 2, wherein said pore structure of the catalyst is characterized as having less than 5% of the pore volume in pores of diameter greater than 1000 Angstrom.

4. A process according to claim 1, wherein said Group VIII metal consists of nickel.

5. A process according to claim 1, wherein the hydrodemetalating conditions comprise:
    (a) temperature ranging from about 500° F. to about 900° F.;
    (b) total pressure ranging from about 500 psig to about 3500 psig;
    (c) hydrogen partial pressure ranging from about 600 psig to about 2800 psig; and
    (d) space velocity ranging from about 0.1 to about 6.0.

6. A process according to claim 1, wherein the process conditions comprise:
    (a) temperature ranging from about 600° F. to about 800° F.;

(b) total pressure ranging from about 1200 psig to about 3000 psig;
(c) hydrogen partial pressure ranging from about 1000 psig to about 2500; and
(d) space velocity ranging from about 0.5 to about 6.0.

7. A process according to claim 1, wherein the process conditions comprise:

(a) temperature ranging from about 650° F. to about 800° F.;
(b) total pressure ranging from about 1600 psig to about 2800 psig;
(c) hydrogen partial pressure ranging from about 1500 psig to about 2200 psig; and
(d) space velocity ranging from about 0.5 to about 1.7.

* * * * *